United States Patent
Omiya et al.

(10) Patent No.: US 12,244,368 B2
(45) Date of Patent: Mar. 4, 2025

(54) REFLECTION DIRECTION CONTROL METHOD, REFLECTION DIRECTION CONTROL SYSTEM, REFLECTION DIRECTION CONTROL DEVICE, AND REFLECTION DIRECTION CONTROL PROGRAM

(71) Applicant: NIPPON TELEGRAPH AND TELEPHONE CORPORATION, Tokyo (JP)

(72) Inventors: Riku Omiya, Musashino (JP); Masashi Iwabuchi, Musashino (JP); Tomoki Murakami, Musashino (JP); Tomoaki Ogawa, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 38 days.

(21) Appl. No.: 18/017,480

(22) PCT Filed: Jul. 28, 2020

(86) PCT No.: PCT/JP2020/028906
§ 371 (c)(1),
(2) Date: Jan. 23, 2023

(87) PCT Pub. No.: WO2022/024223
PCT Pub. Date: Feb. 3, 2022

(65) Prior Publication Data
US 2023/0275624 A1    Aug. 31, 2023

(51) Int. Cl.
*H04B 7/0413*     (2017.01)
*H04B 7/14*       (2006.01)

(52) U.S. Cl.
CPC ............ *H04B 7/0413* (2013.01); *H04B 7/14* (2013.01)

(58) Field of Classification Search
CPC .... H04B 7/0413; H04B 7/14; H04B 7/04013; H04B 7/15557; H04B 7/15528; H01Q 3/46
See application file for complete search history.

(56) References Cited

U.S. PATENT DOCUMENTS

| | | | |
|---|---|---|---|
| 2021/0336658 A1* | 10/2021 | Shimon | H04B 7/0413 |
| 2023/0129288 A1* | 4/2023 | Sun | H04B 7/04026 375/267 |
| 2023/0275624 A1* | 8/2023 | Omiya | H04B 7/0413 375/262 |

FOREIGN PATENT DOCUMENTS

| | | |
|---|---|---|
| JP | 2016-052108 A | 4/2016 |
| JP | 2017-152872 A | 8/2017 |

OTHER PUBLICATIONS

C. Liaskos, A. Tsioliaridou, A. Pitsillides, S. loannidis, and I. Akyildiz, "Using Any Surface to Realize a New Paradigm for Wireless Communications", Communications of the ACM, Nov. 2018., vol. 61, No. 11, pp. 30-33.

(Continued)

*Primary Examiner* — Jaison Joseph

(57) ABSTRACT

A reflection direction control method includes an arrival direction estimation step of estimating an arrival direction of radio waves transmitted by a wireless terminal to one or more reflection units each including a plurality of reflection elements capable of dynamically changing phase characteristics when the radio wave is reflected, a phase control step of controlling a phase of a radio wave reflected by each of the plurality of reflection elements so that the reflection unit reflects, in a predetermined direction, the radio wave transmitted from the estimated arrival direction, and a switching (Continued)

step of switching between an antenna mode in which the reflection unit is caused to receive the radio wave of which the arrival direction is estimated and a reflection mode in which the reflection unit is caused to reflect the radio wave.

6 Claims, 6 Drawing Sheets

(56) References Cited

OTHER PUBLICATIONS

E. Basar, M. D. Renzo, J. D. Rosny, M. Debbah, M-SAlouini, and R. Zhang, "Wireless Communications Through Reconfigurable Intelligent Surfaces", IEEE Access, Aug. 2019., vol. 7, pp. 116753-116773.
Q. Wu, and R. Zhang, "Intelligent Reflecting Surface Enhanced Wireless Network via Joint Active and Passive Beamforming", IEEE transaction on wireless communications, Nov. 2019., vol. 18, No. 11, pp. 5394-5409.
Xinying Ma et al., "Channel Estimation for Intelligent Reflecting Surface Enabled Terahertz MIMO Systems", 2020 IEEE International Conference on Communications Workshops (ICC Workshops), Jun. 11, 2020, sections I, II, fig. 2.
Qingqing Wu et al., "Intelligent Reflecting Surface Enhanced Wireless Network: Joint Active and Passive Beamforming Design", 2018 IEEE Global Communications Conference (Globecom), IEEE, Dec. 13, 2018, sections I, II, fig. 1.

* cited by examiner

REFLECTION DIRECTION CONTROL METHOD, REFLECTION DIRECTION CONTROL SYSTEM, REFLECTION DIRECTION CONTROL DEVICE, AND REFLECTION DIRECTION CONTROL PROGRAM

CROSS-REFERENCE TO RELATED APPLICATIONS

This application is a 371 U.S. National Phase of International Application No. PCT/JP2020/028906, filed on Jul. 28, 2020. The entire disclosure of the above application is incorporated herein by reference.

TECHNICAL FIELD

The present invention relates to a reflection direction control method, a reflection direction control system, a reflection direction control device, and a reflection direction control program.

BACKGROUND ART

Using a high frequency band that can ensure a broad band is drawing attention in order to realize high speed and large capacity wireless access. For example, high speed and large capacity are realized by using a 28 GHz band in a 5th generation mobile communication system and a 60 GHz band in an IEEE 802.11ad (millimeter wave wireless LAN system) that is a wireless LAN standard.

Radio waves in a high frequency band are easily attenuated as compared to radio waves in a low frequency band, and have radio properties of being less likely to be diffracted. Therefore, when a high frequency band is utilized, there are problems that a transmission distance is short and reception quality greatly deteriorates due to shielding.

In order to compensate for attenuation of radio waves, beamforming that uses a multielement antenna in a transmission station and a reception station is effective. That is, the radio wave attenuation is compensated for by a beamforming gain so that a transmission distance can be increased.

In the beamforming, because radio waves from a specific direction are strongly transmitted and received in both the transmission station and the reception station, a high-power radio wave from one path is mainly received by the reception station. As a result, the number of spatial multiplexing times is kept as 1 in the beamforming (or 2 in the case of polarized multiplexing), and it is also difficult to achieve a space diversity effect by receiving the same signal.

On the other hand, there is a method of installing a large number of transmission antennas in order to improve the degraded reception quality in shielding or a non-line-of-sight. For example, it is possible to reduce a range of the shielding or non-line-of-sight by installing a large number of transmission antennas. Further, it is also possible to solve the problem in beamforming described above by installing a large number of transmission antennas.

However, there is a problem that installation of a large number of transmission antennas causes an increase in network cost or insufficient installation places. From the viewpoint of providing a large number of transmission points, it is also effective to use a reflection plate or the like that is less expensive and has a smaller installation size and fewer restrictions.

In the related art, it is difficult to dynamically control reflection characteristics. However, because a reflection plate capable of dynamic control of reflection characteristics using a metasurface or array element configuration (a dynamic reflection plate) can be developed, it is possible to realize a method for achieving spatial multiplexing or a space diversity gain while using the dynamic reflection plate to reduce the range of the shielding or non-line-of-sight (NPL 1, 2, and 3).

A method of controlling the dynamic reflection plate includes a method of changing characteristics of a radio wave by controlling a phase of the radio wave when the dynamic reflection plate reflects the radio wave. For example, there is a method of changing a phase of a radio wave reflected by a dynamic reflection plate configured of array elements on the basis of channel information (CSI: Channel State Information) between a transmission station and a reception station (for example, refer to NPL 3).

CITATION LIST

Non Patent Literature

[NPL 1] C. Liaskos, A. Tsioliaridou, A. Pitsillides, S. Ioannidis, and I. Akyildiz, "Using Any Surface to Realize a New Paradigm for Wireless Communications", Communications of the ACM, November 2018, Vol. 61, No. 11, pp. 30-33

[NPL 2] E. Basar, M. D. Renzo, J. D. Rosny, M. Debbah, M-SAlouini, and R. Zhang, "Wireless Communications Through Reconfigurable Intelligent Surfaces", IEEE Access, August 2019, Vol. 7, pp. 116753-116773

[NPL 3] Q. Wu, and R. Zhang, "Intelligent Reflecting Surface Enhanced Wireless Network via Joint Active and Passive Beamforming", IEEE transaction on wireless communications, November 2019, vol. 18, no. 11, pp. 5394-5409

SUMMARY OF INVENTION

Technical Problem

However, in a scheme of the related art based on channel information between a transmission station and a reception station, it is possible to optimize characteristics in the reception station, but channel information of each array element through which the radio wave passes is required. For example, when the dynamic reflection plate is configured of 100 array elements, it is necessary to calculate an amount of phase change on the basis of 100 pieces of channel information.

In other words, a large overhead occurs because the channel information is acquired. Further, because it is considered that a certain calculation resource is required to calculate an amount of phase change of each array element, it is assumed that the amount of phase change is calculated on the base station side. In this case, quality improvement by the dynamic reflection plate cannot be realized unless the base station has a new function.

It is also assumed that the base station and the dynamic reflection plate are installed at separate places. Therefore, in a method of the related method, a communication means for reflecting an amount of phase change calculated by the base station in the dynamic reflection plate is required, and the dynamic reflection plate also needs a function of cooperating with the base station.

The present invention has been made in view of the above-described problem, and an object of the present invention is to provide a reflection direction control method, a reflection direction control system, a reflection direction control device, and a reflection direction control program capable of dynamically controlling a reflection direction of a radio wave with a small amount of calculation.

Solution to Problem

A reflection direction control method according to an aspect of the present invention includes an arrival direction estimation step of estimating an arrival direction of radio waves transmitted by a wireless terminal to one or more reflection units each including a plurality of reflection elements capable of dynamically changing phase characteristics when the radio wave is reflected; a phase control step of controlling a phase of a radio wave reflected by each of the plurality of reflection elements so that the reflection unit reflects, in a predetermined direction, the radio wave transmitted from the estimated arrival direction; and a switching step of switching between an antenna mode in which the reflection unit is caused to receive the radio wave of which the arrival direction is estimated and a reflection mode in which the reflection unit is caused to reflect the radio wave.

A reflection direction control system according to an aspect of the present invention includes one or more reflection units each including a plurality of reflection elements capable of dynamically changing phase characteristics when the radio wave is reflected; an arrival direction estimation unit configured to estimate an arrival direction of a radio wave transmitted to the reflection unit by a wireless terminal; a phase control unit configured to control a phase of a radio wave reflected by each of the plurality of reflection elements so that the reflection unit reflects, in a predetermined direction, the radio wave transmitted from the arrival direction estimated by the arrival direction estimation unit; and a switching unit configured to switch between an antenna mode in which the reflection unit is caused to receive the radio wave of which the arrival direction is estimated by the arrival direction estimation unit and a reflection mode in which the reflection unit is caused to reflect the radio wave under control of the phase control unit.

A reflection direction control device according to an aspect of the present invention includes an arrival direction estimation unit configured to estimate an arrival direction of a radio wave transmitted by a wireless terminal to one or more reflection units each including a plurality of reflection elements capable of dynamically changing phase characteristics when the radio wave is reflected; a phase control unit configured to control a phase of the radio wave reflected by each of the plurality of reflection elements so that the reflection unit reflects, in a predetermined direction, the radio wave transmitted from the arrival direction estimated by the arrival direction estimation unit; and a switching unit configured to switch between an antenna mode in which the reflection unit is caused to receive the radio wave of which the arrival direction is estimated by the arrival direction estimation unit and a reflection mode in which the reflection unit is caused to reflect the radio wave under control of the phase control unit.

Advantageous Effects of Invention

According to the present invention, it is possible to dynamically control a reflection direction of a radio wave with a small amount of calculation.

DESCRIPTION OF EMBODIMENTS

Figure 6:
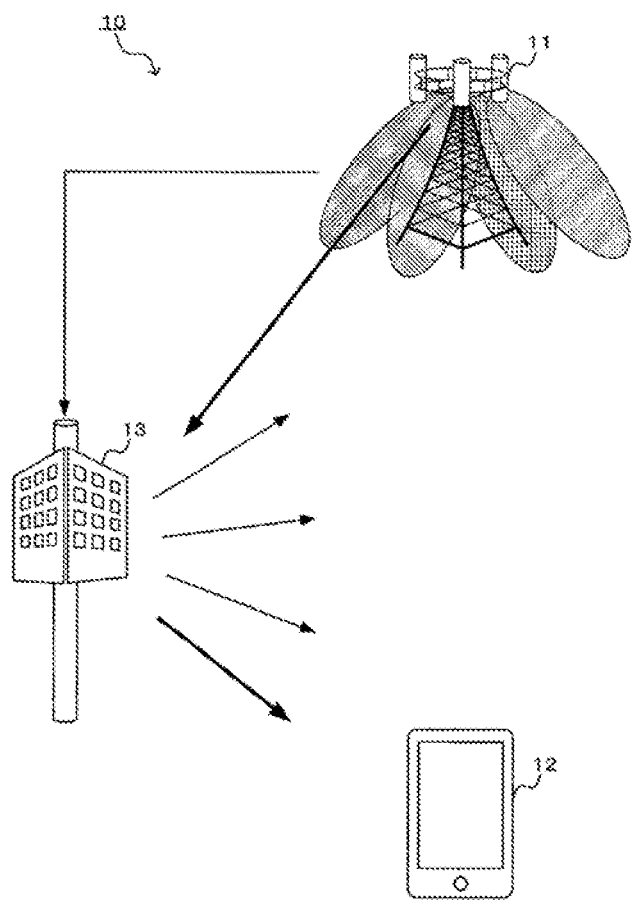
FIG. 6 is a diagram illustrating a configuration example of a wireless communication system in a comparative example including a dynamic reflection plate.

A background in which the present invention has been achieved will be first described in description of a reflection direction control system according to an embodiment. FIG. 6 is a diagram illustrating a configuration example of a wireless communication system 10 in a comparative example including a dynamic reflection plate.

In a wireless communication system 10, a dynamic reflection plate 13 including a plurality of reflection elements reflects and relays radio waves in order to perform wireless communication between a base station 11 and a wireless terminal 12. In this case, the base station 11 acquires channel information (CSI: Channel State Information) for all of the plurality of reflection elements included in the dynamic reflection plate 13, and adjusts a phase of a radio wave reflected by the dynamic reflection plate 13.

Therefore, in addition to a general base station function, the base station 11 needs an advanced signal processing function for acquiring and processing channel information for all of the plurality of reflection elements, and a function for notifying the dynamic reflection plate 13 of information on a phase for changing reflection characteristics.

That is, in the base station 11, when an overhead for acquiring channel information increases and the number of reflection elements is large, an amount of calculation for dynamically controlling the phase of the radio wave reflected by the dynamic reflection plate 13 becomes enormous.

Figure 1:
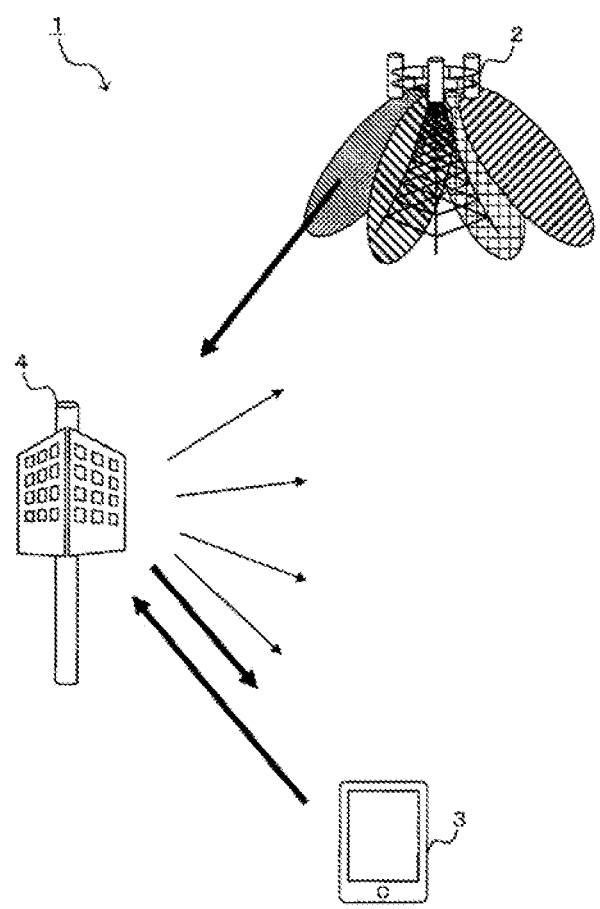
FIG. 1 is a diagram illustrating a configuration example of a wireless communication system according to an embodiment of the present invention.

Next, a wireless communication system including a reflection direction control system according to an embodiment will be described. FIG. 1 is a diagram illustrating a configuration example of the wireless communication system 1 according to an embodiment of the present invention. As illustrated in FIG. 1, the wireless communication system 1 is configured such that, for example, a base station 2 and one or more wireless terminals 3 perform wireless communication via a reflection direction control system 4.

The reflection direction control system 4 is configured to reflect a radio wave transmitted by the wireless terminal 3 toward the base station 2 and reflect a radio wave transmitted by the base station 2 toward the wireless terminal 3.

Figure 2:
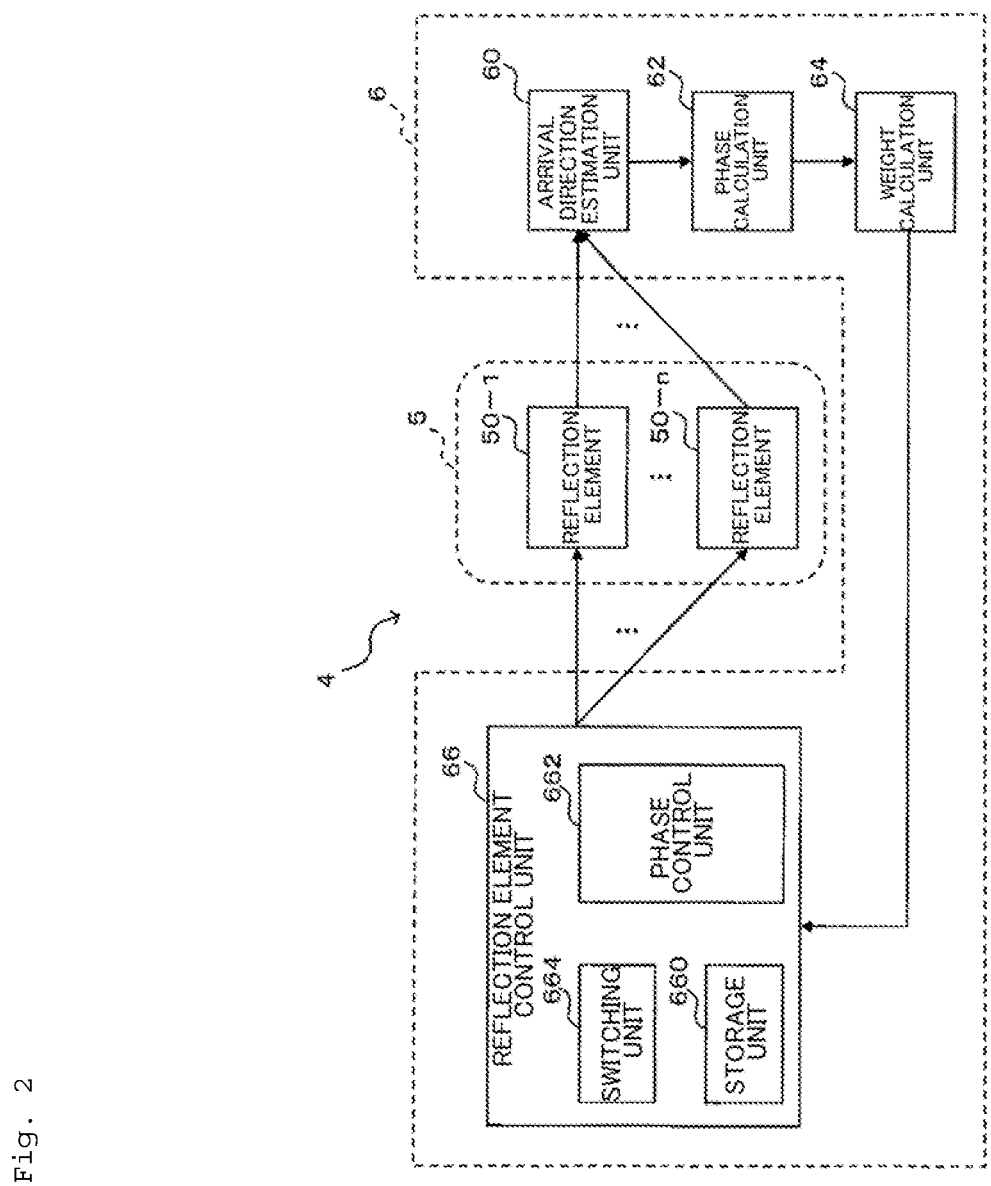
FIG. 2 is a functional block diagram illustrating functions of a reflection direction control system according to an embodiment.

FIG. 2 is a functional block diagram illustrating functions of the reflection direction control system 4 according to an embodiment. As illustrated in FIG. 2, the reflection direction control system 4 includes a reflection unit 5 and a reflection direction control device 6.

The reflection unit 5 is a dynamic reflection plate (IRS: Intelligent Reflecting Surface) that includes, for example, n reflection elements 50-1 to 50-$n$ and, for example, the reflection elements 50-1 to 50-$n$, are arranged in an array form. The reflection elements 50-1 to 50-$n$ reflect the radio wave transmitted by the base station 2 and the radio wave transmitted by the wireless terminal 3 according to the control of the reflection direction control device 6. For example, the reflection elements 50-1 to 50-$n$ are of a so-called metamaterial, and a phase characteristic thereof can be dynamically changed when the radio wave is reflected.

Further, the reflection unit 5 may be configured to receive a radio wave having a frequency lower than a predetermined value when the switching unit 664 switches to an antenna mode, and reflect a radio wave having a frequency higher than the predetermined value when the switching unit 664 switches to a reflection mode, as will be described later.

The reflection direction control device 6 includes an arrival direction estimation unit 60, a phase calculation unit 62, a weight calculation unit 64, and a reflection element control unit 66, and controls an operation and function of the reflection unit 5.

The arrival direction estimation unit 60 estimates, for example, an arrival direction of the radio wave transmitted by the wireless terminal 3 to the reflection unit 5, and outputs arrival direction information indicating the estimated arrival direction of the radio wave to the phase calculation unit 62. Specifically, when the reflection unit 5 receives the radio wave transmitted by the wireless terminal 3 in the antenna mode (to be described later), the arrival direction estimation unit 60 estimates the arrival direction of the radio wave transmitted by the wireless terminal 3 on the basis of the radio wave received by the reflection unit 5.

The phase calculation unit 62 calculates the phase of radio waves to be reflected by each of the reflection elements 50-1 to 50-$n$, for example, so that the reflection unit 5 reflects the radio wave transmitted toward the reflection unit 5 by the wireless terminal 3 in a predetermined direction (for example, a direction of the base station 2), on the basis of the arrival direction information output by the arrival direction estimation unit 60, and outputs phase information indicating the calculated phase to the weight calculation unit 64.

The weight calculation unit 64 calculates a weight corresponding to a phase to be changed for each of the reflection elements 50-1 to 50-$n$, on the basis of phase information output by the phase calculation unit 62, and outputs the calculated weight to the reflection element control unit 66.

The weight calculation unit 64 can calculate the weight so as to maximize the directivity of the reflection unit 5 or can calculate the weight so as to minimize (null) the directivity of the reflection unit 5, on the basis of the phase information output by the phase calculation unit 62, for example.

The reflection element control unit 66 includes a storage unit 660, a phase control unit 662, and a switching unit 664. The storage unit 660 stores information such as the weight output by the weight calculation unit 64, and outputs the stored information to the phase control unit 662 in response to access from the phase control unit 662.

The phase control unit 662 controls the reflection elements 50-1 to 50-$n$ so that the phases of the radio wave to be reflected are shifted little by little on the basis of, for example, the weights stored in the storage unit 660. For example, when the reflection elements 50-1 to 50-$n$ are the meta-material described above, the phase control unit 662 changes characteristics of the reflection elements 50-1 to 50-$n$ to dynamically change a phase shift amount, and performs control so that the reflection unit 5 performs beam forming in a predetermined direction.

That is, the phase control unit 662 controls the phase of the radio wave reflected by each of the reflection elements 50-1 to 50-$n$ so that the reflection unit 5 reflects a radio wave transmitted from the arrival direction estimated by the arrival direction estimation unit 60 in a predetermined direction.

The switching unit 664 switches between an antenna mode in which the reflection unit 5 is caused to receive the radio wave of which the arrival direction is estimated by the arrival direction estimation unit 60 and a reflection mode in which the reflection unit 5 is caused to reflect the radio wave under control of the phase control unit 662, according to an instruction from an operator or predetermined setting.

That is, the reflection direction control system 4 is configured to be able to switch between an antenna mode in which the reflection unit 5 is used to estimate the arrival direction of the radio wave transmitted by the wireless terminal 3 and a reflection mode in which communication between the wireless terminal 3 and the base station 2 is relayed by reflection in the reflection unit 5, for example, according to an instruction from an operator or a predetermined setting.

The radio wave received by the reflection unit 5 in the antenna mode may be, for example, a low-frequency test signal transmitted by the wireless terminal 3 or, for example, a normal high-frequency signal transmitted by the wireless terminal 3.

Figure 3:
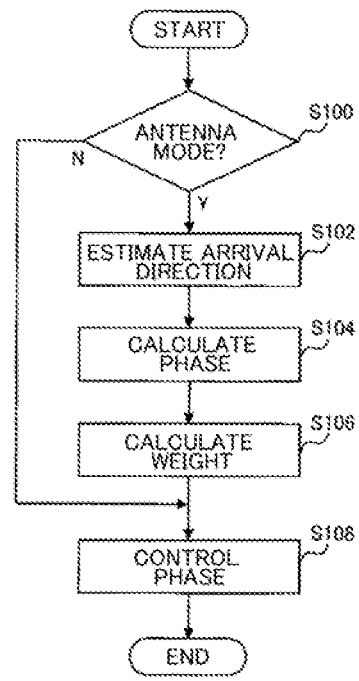
FIG. 3 is a flowchart illustrating an operation example of the reflection direction control system according to an embodiment.

FIG. 3 is a flowchart illustrating an operation example of the reflection direction control system 4 according to an embodiment. As illustrated in FIG. 3, the reflection direction control system 4 determines whether or not the switching unit 664 performs switching to the antenna mode (S100). The reflection direction control system 4 proceeds to processing of S102 when the reflection direction control system 4 determines that the switching unit 664 performs switching to the antenna mode (S100: Yes), and proceeds to processing of S108 when the reflection direction control system 4 determines that the switching unit 664 does not perform switching to the antenna mode (S100: No).

In the reflection direction control system 4, when the arrival direction estimation unit 60 estimates the arrival direction of the radio wave that the wireless terminal 3 has transmitted to the reflection unit 5 (S102), the phase calculation unit 62 calculates the phase of each of the reflection elements 50-1 and 50-$n$ on the basis of arrival direction information (S104).

When a weight calculation unit 64 calculates the weights of the respective reflection elements 50-1 to 50-$n$ on the basis of the phase information (S106), the reflection direction control system 4 stores the calculated weights in the storage unit 660.

In the reflection direction control system 4, the phase control unit 662 performs phase control on each of the reflection elements 50-1 to 50-$n$ using the weights stored in the storage unit 660, so that the reflection unit 5 performs beam forming in a predetermined direction (S108).

Figure 4:
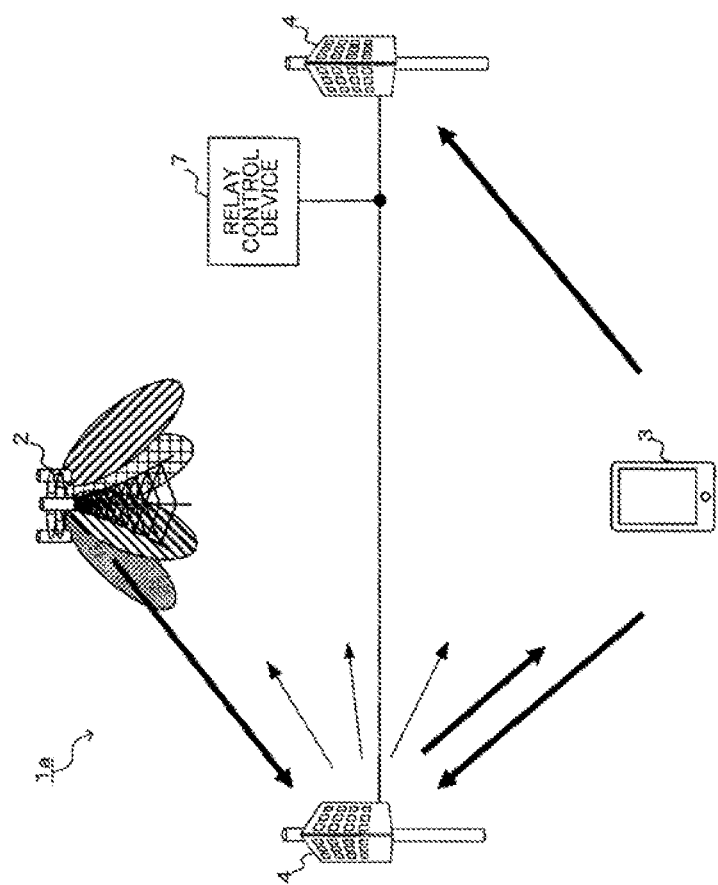
FIG. 4 is a diagram illustrating a configuration of a modification example of a wireless communication system.

Hereinafter, a modification example of the wireless communication system 1 will be described. FIG. 4 is a diagram illustrating a configuration of the modification example (a wireless communication system 1$a$) of the wireless communication system 1. As illustrated in FIG. 4, the wireless communication system 1$a$ is configured such that, for example, the base station 2 and one or more wireless terminals 3 can perform wireless communication via a plurality of reflection direction control systems 4.

Further, each of the reflection direction control systems 4 can communicate with the relay control device 7 via a communication unit (not illustrated). The relay control device 7 controls each of the reflection direction control systems 4, so that the base station 2 and the wireless terminal 3 can perform wireless communication via at least one of the reflection direction control systems 4.

In the wireless communication system 1a, when the respective reflection units 5 (FIG. 2) included in the plurality of reflection direction control systems 4 receive the radio wave transmitted by the wireless terminal 3 in the antenna mode, the arrival direction estimation unit 60 may estimate the arrival direction of the radio wave transmitted by the wireless terminal 3 on the basis of the radio wave received by each of the plurality of reflection units 5.

Functions of the reflection direction control device 6 may be included in each of the reflection direction control systems 4 or may be included in the relay control device 7.

Thus, because the wireless communication system 1 and the wireless communication system 1a switch between the antenna mode in which the reflection unit 5 is caused to receive the radio wave of which the arrival direction is estimated by the arrival direction estimation unit 60 and the reflection mode in which the reflection unit 5 is caused to reflect the radio wave under control of the phase control unit 662, it is possible to dynamically control a reflection direction of a radio wave with a small amount of calculation.

That is, the wireless communication system 1 and the wireless communication system 1a can dynamically control the reflection direction of the radio wave even when the wireless communication system 1 and the wireless communication system 1a do not include an advanced signal processing function for processing the channel information for all of the reflection elements, without acquiring the channel information for all of the plurality of reflection elements.

In the wireless communication system 1 and the wireless communication system 1a, because the reflection direction control system 4 controls the phase of the radio wave to be reflected by each of the reflection elements 50-1 and 50-*n* when the radio wave arrives, it is also possible to expand a coverage of the base station 2.

Functions of the reflection direction control device 6 may be partially or entirely configured of hardware such as a programmable logic device (PLD) or a field programmable gate array (FPGA), or may be configured as a program that is executed by a processor such as a CPU.

For example, the reflection direction control device 6 according to the present invention can be realized using a computer and a program, and the program can be recorded on a storage medium or provided through a network.

Figure 5:
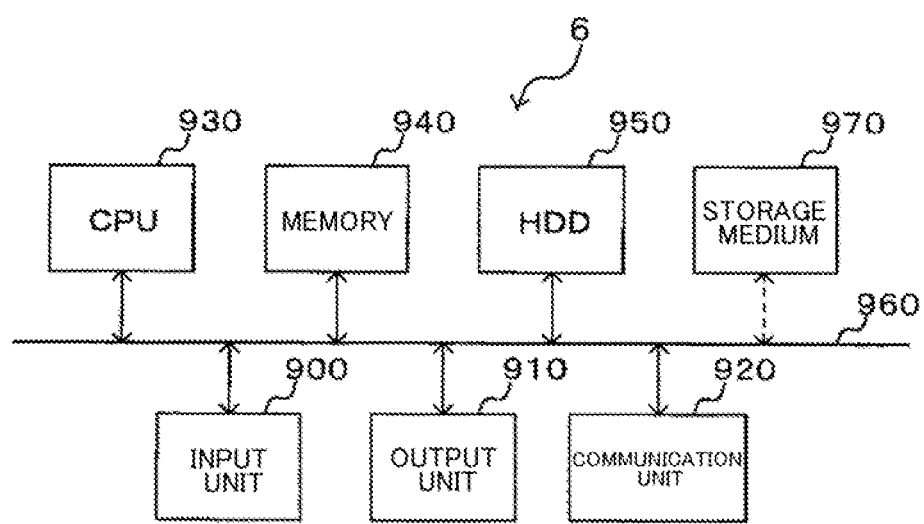
FIG. 5 is a diagram illustrating an example of a hardware configuration of a reflection direction control device according to the embodiment.

FIG. 5 is a diagram illustrating an example of a hardware configuration of the reflection direction control device 6 according to the embodiment. As illustrated in FIG. 5, for example, the reflection direction control device 6 includes an input unit 900, an output unit 910, a communication unit 920, a CPU 930, a memory 940, and an HDD 950 connected via a bus 960, and includes a function of a computer. The reflection direction control device 6 can input and output data to and from a computer-readable storage medium 970.

The input unit 900 is, for example, a keyboard, a mouse, or a touch panel. The output unit 910 is, for example, a display device such as a display. The communication unit 920 is, for example, a wireless network interface.

The CPU 930 controls the respective units constituting the reflection direction control device 6 as described above, and performs predetermined processing or the like. The memory 940 and the HDD 950 are, for example, the above-described storage unit 660 that stores data or the like.

The storage medium 970 can store, for example, a program for executing functions of the reflection direction control device 6. An architecture constituting the reflection direction control device 6 is not limited to the example illustrated in FIG. 5. Another configuration constituting the wireless communication system 1a such as the relay control device 7 may be the same hardware configuration as the reflection direction control device 6.

It is assumed that a "computer" as used herein includes an OS or hardware such as peripheral devices. Further, the "computer-readable storage medium" refers to a storage device such as a flexible disk, a magneto-optical disc, a ROM, or a portable medium such as a CD-ROM.

Further, the "computer-readable storage medium" may also include a recording medium that dynamically holds a program for a short time, such as a communication line used in the case of transmitting a program via a network such as the Internet or a communication line such as a telephone line, or a recording medium in which a program is held for a certain time, such as a volatile memory inside a computer that serves as a server or a client in such a case.

Although the embodiment of the present invention has been described above with reference to the drawings, it is obvious that the above-described embodiment is merely an example of the present invention and the present invention is not limited to the above-described embodiment. Accordingly, additions, omissions, substitutions, and other modifications of components may be made without departing from the technical spirit and scope of the present invention.

REFERENCE SIGNS LIST

1, 1a Wireless communication system
2 Base station
3 Wireless terminal
4 Reflection direction control system
5 Reflection unit
6 Reflection direction control device
7 Relay control device
50-1 to 50-*n* Reflection element
60 Arrival direction estimation unit
62 Phase calculation unit
64 Weight calculation unit
66 Reflection element control unit
660 Storage unit
662 Phase control unit
664 Switching unit
900 Input unit
910 Output unit
920 Communication unit
930 CPU
940 Memory
950 HDD
960 Bus
970 Storage medium

The invention claimed is:

1. A reflection direction control method comprising:
   an arrival direction estimation step of estimating an arrival direction of radio waves transmitted by a wireless terminal to one or more reflection units each including a plurality of reflection elements capable of dynamically changing phase characteristics when the radio wave is reflected;
   a phase control step of controlling a phase of a radio wave reflected by each of the plurality of reflection elements so that the reflection unit reflects, in a predetermined direction, the radio wave transmitted from the estimated arrival direction; and a switching step of switching between an antenna mode in which the reflection unit is caused to receive the radio wave of which the arrival direction is estimated and a reflection mode in which the reflection unit is caused to reflect the radio wave;

wherein, when switching to the reflection mode is performed in the switching step, the reflection unit reflects a radio wave at a frequency different from that when the switching unit performs switching to the antenna mode.

2. The reflection direction control method according to claim 1, wherein, when each of the plurality of reflection units receives the radio wave transmitted by the wireless terminal in the antenna mode, the arrival direction estimation step includes estimating the arrival direction of the radio wave transmitted by the wireless terminal on the basis of the radio wave received by each of the plurality of reflection units.

3. A reflection direction control system comprising:

one or more reflection units each including a plurality of reflection elements capable of dynamically changing phase characteristics when a radio wave is reflected;

an arrival direction estimation unit configured to estimate an arrival direction of a radio wave transmitted to the reflection unit by a wireless terminal;

a phase control unit configured to control a phase of a radio wave reflected by each of the plurality of reflection elements so that the reflection unit reflects, in a predetermined direction, the radio wave transmitted from the arrival direction estimated by the arrival direction estimation unit; and a switching unit configured to switch between an antenna mode in which the reflection unit is caused to receive the radio wave of which the arrival direction is estimated by the arrival direction estimation unit and a reflection mode in which the reflection unit is caused to reflect the radio wave under control of the phase control unit;

wherein, when the switching unit performs switching to the reflection mode, the reflection unit reflects a radio wave at a frequency different from that when the switching unit performs switching to the antenna mode.

4. The reflection direction control system according to claim 3, wherein, when each of the plurality of reflection units receives a radio wave transmitted by the wireless terminal in the antenna mode, the arrival direction estimation unit estimates an arrival direction of the radio wave transmitted by the wireless terminal on the basis of the radio wave received by each of the plurality of reflection units.

5. A reflection direction control device comprising:

an arrival direction estimation unit configured to estimate an arrival direction of a radio wave transmitted by a wireless terminal to one or more reflection units each including a plurality of reflection elements capable of dynamically changing phase characteristics when the radio wave is reflected;

a phase control unit configured to control a phase of the radio wave reflected by each of the plurality of reflection elements so that the reflection unit reflects, in a predetermined direction, the radio wave transmitted from the arrival direction estimated by the arrival direction estimation unit; and a switching unit configured to switch between an antenna mode in which the reflection unit is caused to receive the radio wave of which the arrival direction is estimated by the arrival direction estimation unit and a reflection mode in which the reflection unit is caused to reflect the radio wave under control of the phase control unit;

wherein, when the switching unit performs switching to the reflection mode, the reflection unit reflects a radio wave at a frequency different from that when the switching unit performs switching to the antenna mode.

6. A non-transitory computer-readable storage medium storing a reflection direction control program for causing a computer to function as the respective units of the reflection direction control device according to claim 5.

* * * * *